United States Patent
Choi et al.

(10) Patent No.: US 8,964,876 B2
(45) Date of Patent: Feb. 24, 2015

(54) ERROR COMPENSATION TRANSCEIVER SYSTEM

(75) Inventors: Dong-ho Choi, Suwon-si (KR); Young-min Ku, Suwon-si (KR); O-deuk Kwon, Seoul (KR)

(73) Assignee: Seagate Technology International, Grand Cayman (KY)

( * ) Notice: Subject to any disclaimer, the term of this patent is extended or adjusted under 35 U.S.C. 154(b) by 535 days.

(21) Appl. No.: 13/030,282

(22) Filed: Feb. 18, 2011

(65) Prior Publication Data

US 2011/0243205 A1    Oct. 6, 2011

(30) Foreign Application Priority Data

Feb. 19, 2010  (KR) .................................. 2010-15250

(51) Int. Cl.
| | | |
|---|---|---|
| *H04B 15/00* | (2006.01) | |
| *H04L 27/00* | (2006.01) | |
| *H04L 27/08* | (2006.01) | |

(52) U.S. Cl.
CPC ............ *H04L 27/0008* (2013.01); *H04L 27/08* (2013.01)
USPC .......................................... 375/285; 375/259

(58) Field of Classification Search
USPC ....................................................... 375/285
See application file for complete search history.

(56) References Cited

U.S. PATENT DOCUMENTS

| | | | | |
|---|---|---|---|---|
| 6,061,574 | A  * | 5/2000 | Goldberg ....................... | 455/503 |
| 6,072,825 | A  * | 6/2000 | Betts et al. .................... | 375/222 |
| 2002/0097804 | A1* | 7/2002 | Perner ........................... | 375/243 |
| 2005/0096544 | A1* | 5/2005 | Hao et al. ...................... | 600/447 |
| 2007/0205811 | A1* | 9/2007 | Nguyen ......................... | 327/108 |
| 2009/0125963 | A1* | 5/2009 | D'amato et al. ............... | 725/118 |
| 2010/0040037 | A1* | 2/2010 | Choi et al. ..................... | 370/345 |
| 2010/0097594 | A1* | 4/2010 | Cho ................................ | 355/71 |
| 2011/0314349 | A1* | 12/2011 | Lee ................................. | 714/748 |

FOREIGN PATENT DOCUMENTS

| | | |
|---|---|---|
| JP | 11-249821 | 9/1999 |
| JP | 2006-085243 | 3/2006 |
| KR | 100672031 | 1/2007 |

* cited by examiner

*Primary Examiner* — Erin File (57) ABSTRACT

A method of compensating for an error and a transceiver system using the method. The method includes determining whether a distortion occurs in data received by a receiving unit; if it is determined that the distortion occurs in the received data, changing at least one of a plurality of transmission parameters of the received data by one step; transmitting the received data using the changed at least one transmission parameter in a transmitting unit; and repeatedly performing the determining, the changing, and the transmitting until it is determined that the distortion does not occur in the received data.

20 Claims, 9 Drawing Sheets

| STEP | V[mV] |
|------|-------|
| A1   | 380   |
| A2   | 400   |
| A3   | 420   |
| A4   | 440   |
| A5   | 460   |
| A6   | 480   |
| A7   | 500   |
| A8   | 520   |
| A9   | 540   |
| A10  | 560   |
| A11  | 580   |
| A12  | 600   |
| A13  | 620   |

FIG. 4

| STEP | V[mV] |
|------|-------|
| P1   | 1     |
| P2   | 2     |
| P3   | 3     |
| P4   | 4     |
| P5   | 5     |
| P6   | 6     |
| P7   | 7     |
| P8   | 8     |
| P9   | 9     |
| P10  | 10    |

FIG. 5

| STEP | T [ps] |
|------|--------|
| S1 | 80 |
| S2 | 90 |
| S3 | 100 |
| S4 | 110 |
| S5 | 120 |
| S6 | 130 |
| S7 | 140 |
| S8 | 150 |
| S9 | 160 |
| S10 | 170 |
| S11 | 180 |
| S12 | 190 |

ERROR COMPENSATION TRANSCEIVER SYSTEM

CROSS-REFERENCE TO RELATED APPLICATIONS

This application claims the benefit of priority under 35 U.S.C. §119 to Korean Patent Application No. 10-2010-0015250, filed on Feb. 19, 2010, in the Korean Intellectual Property Office, the disclosure of which is incorporated herein in its entirety by reference.

BACKGROUND

1. Field of the Invention

The present general inventive concept relates to a method of compensating for an error, and more particularly, to a method of automatically compensating for an error and a transceiver system using the method.

2. Description of the Related Art

Recently, according to an increase in an interface speed, when data is transmitted and received between a transmitting unit and a receiving unit, a signal distortion occurs due to a connection structure and jitter.

SUMMARY

Aspects and utilities of the present general inventive concept will be set forth in part in the description which follows and, in part, will be obvious from the description, or may be learned by practice of the present general inventive concept.

The present general inventive concept provides a method of compensating for an error, the method including determining whether a distortion occurs in data received by a receiving unit, changing at least one of a plurality of transmission parameters of the received data by one step when it is determined that the distortion occurs in the received data, transmitting the received data using the changed at least one transmission parameter in a transmitting unit, and repeatedly performing the determining, the changing, and the transmitting until it is determined that the distortion does not occur in the received data.

The changing may include changing at least one of a plurality of register values to determine the plurality of transmission parameters of the received data by one step.

The changing may include increasing at least one selected from the group consisting of amplitude and a pre-emphasis by one step, and the transmitting may include transmitting the received data by using the increased at least one selected from the group consisting of the amplitude and the pre-emphasis.

Features and/or utilities of the present general inventive concept may also be realized by a transceiver system including a transmitting unit to transmit data, a receiving unit to receive the data and determining whether a distortion occurs in received data, and a control unit. The control unit may change at least one of a plurality of transmission parameters of the received data by one step when the receiving unit determines that the distortion occurs in the received data, and the transmitting unit may transmit the data using the changed at least one transmission parameter.

The control unit may change at least one of a plurality of register values for determining the plurality of transmission parameters of the received data by one step when the receiving unit determines that the distortion occurs in the received data.

When the receiving unit determines that the distortion occurs in the received data, the control unit may increase at least one selected from the group consisting of amplitude and a pre-emphasis by one step, and the transmitting unit may transmit the data by using the increased at least one selected from the group consisting of the amplitude and the pre-emphasis.

Features and/or utilities of the present general inventive concept may also be realized by a data transmission system including a transmitter to transmit a signal may include data, a receiver to receive the transmitted signal, and a control unit to adjust at least one transmission characteristic of the transmitter when it is determined that the signal received by the receiver is distorted. The transmitter may transmit a next signal may include the data after the at least one transmission characteristic of the transmitter is adjusted.

The transmitter may include at least one of a pre-emphasis circuit, an amplitude control circuit, and a skew control circuit, and the control unit may adjust at least one of a pre-emphasis, an amplitude, and a skew rate of the next signal.

The data transmission system may further include at least one of a pre-emphasis control register, an amplitude control register, and a skew control register, and the control unit may adjust a value in at least one of the pre-emphasis control register, the amplitude control register, and the skew control register to adjust the at least one transmission characteristic. The control unit may repeatedly adjust the at least one transmission characteristic until it is determined that the signal received by the receiver is not distorted.

Features and/or utilities of the present general inventive concept may also be realized by a transmitting unit including a transmitter to transmit data, and a transmission characteristic control circuit to adjust a transmission characteristic of a signal carrying the data, wherein the transmitter transmits the data, after the transmitter transmits the data, the transmitter receives a control signal to control the transmission characteristic control circuit to adjust the transmission characteristic of the signal carrying the data, and after adjusting the transmission characteristic, the transmitter re-transmits the data.

The transmission characteristic control circuit may include at least one of a pre-emphasis control circuit, an amplitude control circuit, and a skew rate control circuit.

Features and/or utilities of the present general inventive concept may also be realized by a method of transmitting data including transmitting a signal carrying data, receiving the transmitted signal, detecting a distortion of the received signal, adjusting at least one transmission characteristic of a next signal, and transmitting the next signal carrying the data.

Adjusting the at least one transmission characteristic may include adjusting a pre-emphasis of at least one bandwidth less than an entire bandwidth of the next signal.

Adjusting the at least one transmission characteristic may include adjusting an amplitude of the next signal.

Adjusting the at least one transmission characteristic may include adjusting a skew rate of the next signal.

Adjusting the at least one transmission characteristic may include adjusting a register value corresponding to the at least one transmission characteristic.

The transmission characteristic may be operable within a predetermined range comprised of finite steps, and adjusting the at least one transmission characteristic may include adjusting the at least one transmission characteristic by only one step.

The method may further include repeating the operations of transmitting, receiving, detecting, and adjusting until no distortion is detected in the received signal. A transmitter may transmit the signal, a receiver may receive the signal and detect the distortion, a controller may adjust the at least one transmission characteristic, and each of the transmitter, receiver, and controller may be part of a same transceiver unit.

BRIEF DESCRIPTION OF THE DRAWINGS

Exemplary embodiments of the present general inventive concept will be more clearly understood from the following detailed description taken in conjunction with the accompanying drawings in which.

DETAILED DESCRIPTION OF THE EMBODIMENTS

The attached drawings for illustrating exemplary embodiments of the present general inventive concept are referred to in order to gain a sufficient understanding of the general inventive concept, the merits thereof, and the objectives accomplished by the implementation of the general inventive concept. In the drawings, the thicknesses of layers and regions are exaggerated for convenience of description and clarity, and portions irrelevant to the description are omitted. In the drawings, like reference numerals denote like elements. While the present general inventive concept has been particularly shown and described with reference to exemplary embodiments thereof, it will be understood that various changes in form and details may be made therein without departing from the spirit and scope of the following claims.

Figure 1:
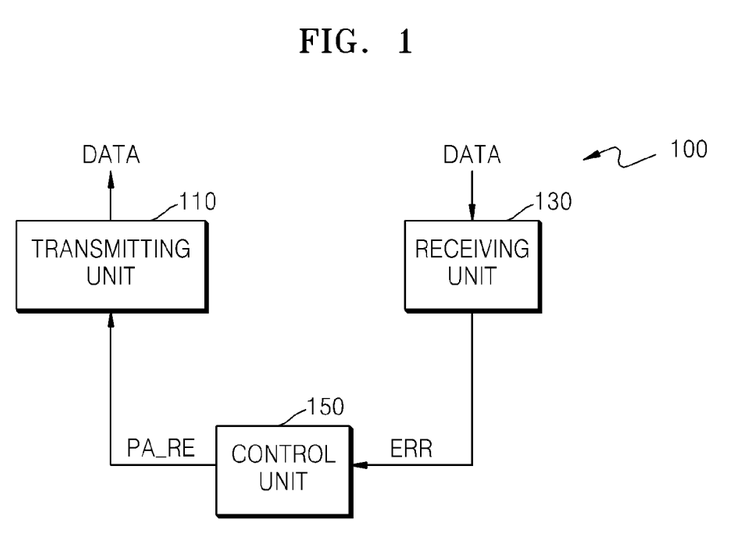
FIG. 1 is a block diagram of a transceiver system, according to an embodiment of the present general inventive concept.

FIG. 1 is a block diagram of a transceiver system 100, according to an embodiment of the inventive concept.

Referring to FIG. 1, the transceiver system 100 according to the present embodiment may include a transmitting unit 110, a receiving unit 130, and a control unit 150. The transmitting unit 110 may transmit data (DATA). The receiving unit 130 may receive the data (DATA). For example, the transmitting unit 110 may transmit the data to a host and the receiving unit 130 may receive the data from the host. However, the general inventive concept is not limited to transmitting the data to the host and receiving the data from the host, and may transmit the data to a predetermined unit and receive the data from the predetermined unit. The receiving unit 130 may determine whether a distortion occurs in the received data. That is, the receiving unit 130 may include a device to determine whether the distortion occurs in the received data. For example, the receiving unit 130 may determine whether a cyclic redundancy check (CRC) error occurs in the received data.

If the distortion occurs in the data received from the receiving unit 130, the control unit 150 may change at least one of a plurality of transmission parameters by one step. In more detail, if the distortion occurs in the data received from the receiving unit 130, the control unit 150 may change at least one of a plurality of register values that determine the transmission parameters. The transmitting unit 110 may transmit the data using information PA_RE regarding the changed at least one transmission parameter received from the control unit 150. The operation of the control unit 150 may be repeatedly performed until the distortion does not occur in the data received from the receiving unit 130. If the distortion does not occur in the data received from the receiving unit 130, the control unit 150 may set the transmission parameters to have values of transmission parameters at the time when the distortion does not occur in the data received from the receiving unit 130.

The transmission parameters may include, for example, amplitude, a pre-emphasis, or a slew rate. However, the general inventive concept is not limited thereto, and the transmission parameters may be other transmission parameters to compensate for the distortion of the received data.

Figure 2:
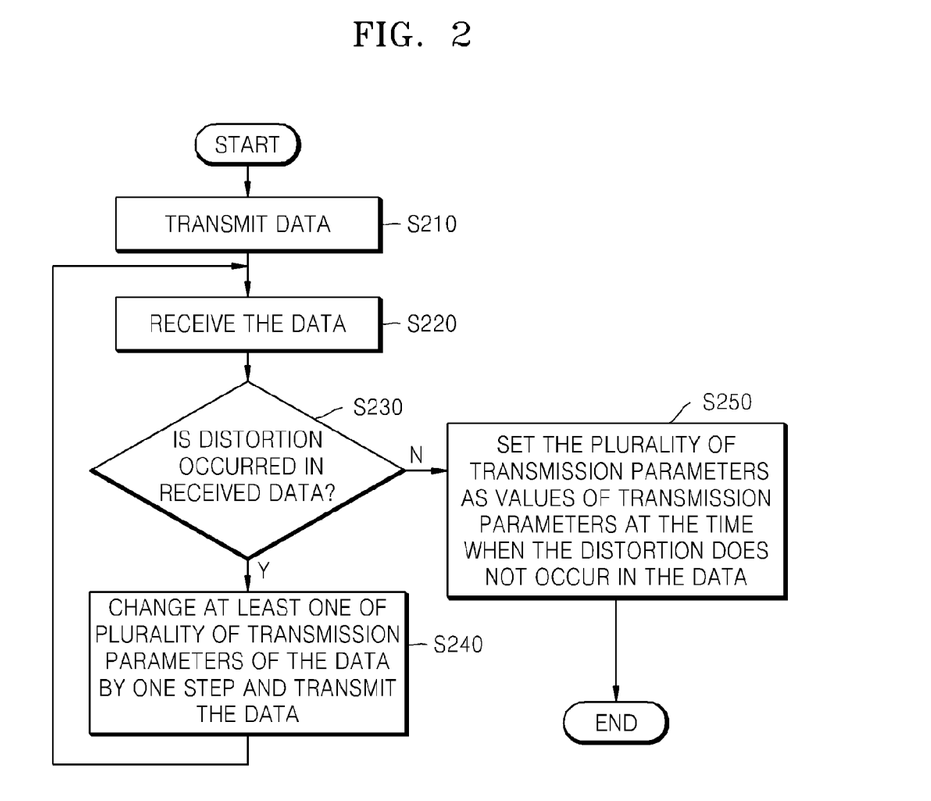
FIG. 2 is a flowchart of a method of compensating for an error of data received in the transceiver system of FIG. 1, according to an embodiment of the present general inventive concept.

FIG. 2 is a flowchart of a method of compensating for an error of data received in the transceiver system 100, according to an embodiment of the present general inventive concept.

Referring to FIGS. 1 and 2, the transmitting unit 110 transmits the data (operation S210). The receiving unit 130 receives the data (operation S220). The receiving unit 130 may determine whether a distortion occurs in the received data (operation S230). For example, in operation S230, the receiving unit 130 may determine whether a CRC error occurs in the received data. If the receiving unit 130 determines that the distortion occurs in the received data in operation S230, the control unit 150 changes at least one of the transmission parameters by one step, and the transmitting unit 110 transmits the data using the changed at least one transmission parameter (operation S240). The receiving unit 130 receives the data transmitted in operation S240 and determines whether a distortion occurs in the received data (operation S230). If the receiving unit 130 determines that the distortion occurs in the received data in operation S230, operation S240 is performed again. If the receiving unit 130 determines that the distortion does not occur in the received data in operation S230, the control unit 150 may set the transmission parameters to have values of transmission parameters at the time when the distortion does not occur in the received data (operation S250).

Figure 3:
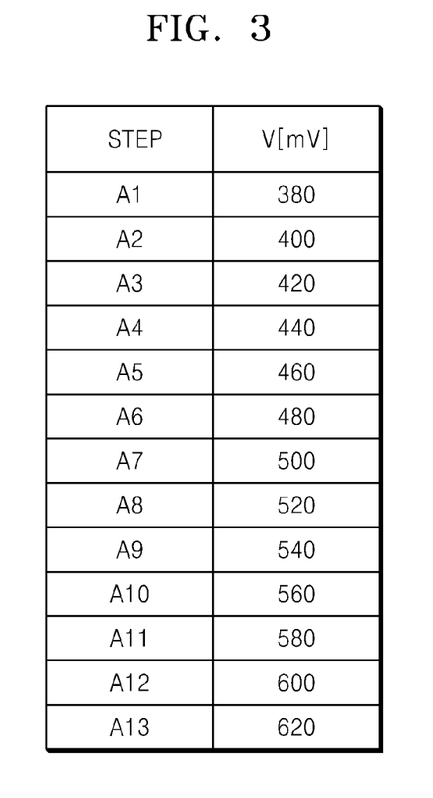
FIG. 3 is a table for explaining a method of compensating for amplitude among transmission parameters, according to an embodiment of the present general inventive concept.

FIG. 3 is a table illustrating a method of compensating for amplitude among transmission parameters, according to an embodiment of the present general inventive concept.

A method of compensating for an error according to an embodiment of the present general inventive concept will now be described with reference to FIGS. 1 through 3. It is assumed for purposes of convenience in FIG. 3 that the transmitting unit 110 initially transmits the data using amplitude in an A7 step. That is, the data transmitted by the transmitting unit 110 has an amplitude value of 500 [mV]. It is assumed that if the data received by the receiving unit 130 has an amplitude value below 500 [mV], the receiving unit 130 determines that a distortion occurs in the received data.

If the data received by the receiving unit 130 has an amplitude value below 440 [mV], the receiving unit 130 may determine that the distortion occurs in the received data in operation S230. Thus, the control unit 150 may perform operation S240 to increase the amplitude value by one step. That is, the control unit 150 may change a register value in such a way that the data to be transmitted has an amplitude value of 520 [mV] in an A8 step in operation S240, and the transmitting unit 110 may transmit the data having the amplitude value of 520 [mV].

If the transmitting unit 110 transmits the data having the amplitude value of 520 [mV], and the receiving unit 130 receives the data having an amplitude value of 460 [mV], the receiving unit 130 may determine that the distortion occurs in the data in operation S230. Thus, the control unit 150 may perform operation S240 again to increase the amplitude value by one step. That is, the control unit 150 may change a register value in such a way that the data to be transmitted has an amplitude value of 540 [mV] in an A9 step in operation S240, and the transmitting unit 110 may transmit the data having the amplitude value of 540 [mV].

If the transmitting unit 110 transmits the data having the amplitude value of 540 [mV], and the receiving unit 130 receives the data having an amplitude value of 480 [mV], the receiving unit 130 may determine that the distortion occurs in the data in operation S230. Thus, the control unit 150 may perform operation S240 again to increase the amplitude value by one step. That is, the control unit 150 may change a register value in such a way that the data to be transmitted has an amplitude value of 560 [mV] in an A10 step in operation S240, and the transmitting unit 110 may transmit the data having the amplitude value of 560 [mV].

If the transmitting unit 110 transmits the data having the amplitude value of 560 [mV], and the receiving unit 130 receives the data having an amplitude value of 500 [mV], the receiving unit 130 may determine that the distortion does not occur in the data in operation S230. Thus, the control unit 150 performs operation S250 to set a register value for determining the amplitude to have the amplitude value of 560 [mV].

Voltage values and voltage differences between the A1 through A13 steps are determined for the descriptive convenience in FIG. 3, and the inventive concept is not limited thereto. That is, the present general inventive concept may use other voltage values and voltage differences between the A1 through A13 steps if occasions demand.

Figure 4:
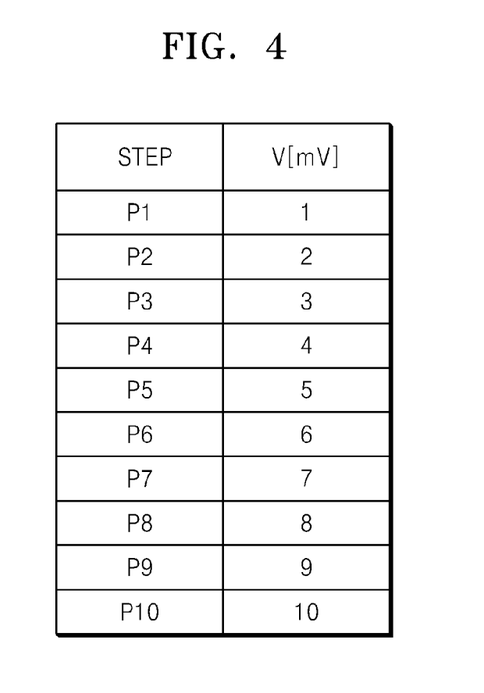
FIG. 4 is a table for explaining a method of determining a pre-emphasis among transmission parameters, according to an embodiment of the present general inventive concept.

FIG. 4 is a table to illustrate a method of determining a pre-emphasis among the transmission parameters, according to an embodiment of the present general inventive concept.

A method of compensating for an error according to an embodiment of the present general inventive concept will now be described with reference to FIGS. 1, 2, and 4. It is assumed in FIG. 4 for purposes of convenience that the transmitting unit 110 initially transmits the data using a pre-emphasis in a P5 step for the descriptive convenience. That is, the data transmitted by the transmitting unit 110 has a pre-emphasis value of 5 [mV]. It is assumed that if the data received by the receiving unit 130 has a pre-emphasis value below 5 [mV], the receiving unit 130 determines that a distortion occurs in the received data.

If the data received by the receiving unit 130 has a pre-emphasis value below 3 [mV], the receiving unit 130 may determine that the distortion occurs in the received data in operation S230. Thus, the control unit 150 may perform operation S240 to increase the pre-emphasis value by one step. That is, the control unit 150 may change a register value in such a way that the data to be transmitted has a pre-emphasis value of 6 [mV] in a P6 step in operation S240, and the transmitting unit 110 may transmit the data DATA having the pre-emphasis value of 6 [mV].

If the transmitting unit 110 transmits the data DATA having the pre-emphasis value of 6 [mV], and the receiving unit 130 receives the data DATA having a pre-emphasis value of 4 [mV], the receiving unit 130 may determine that the distortion occurs in the data DATA in operation S230. Thus, the control unit 150 may perform operation S240 again to increase the pre-emphasis value by one step. That is, the control unit 150 may change a register value in such a way that the data to be transmitted has a pre-emphasis value of 7 [mV] in a P7 step in operation S240, and the transmitting unit 110 may transmit the data having the pre-emphasis value of 7 [mV].

If the transmitting unit 110 transmits the data having the pre-emphasis value of 7 [mV], and the receiving unit 130 receives the data having a pre-emphasis value of 5 [mV], the receiving unit 130 may determine that the distortion does not occur in the data in operation S230. Thus, the control unit 150 performs operation S250 to set a register value for determining the pre-emphasis value to have the pre-emphasis value of 7 [mV].

Voltage values and voltage differences between the P1 through P10 steps are determined for the descriptive convenience in FIG. 4, and the present general inventive concept is not limited thereto. That is, the present general inventive concept may use other voltage values and voltage differences between the P1 through P10 steps if occasions demand.

Figure 5:
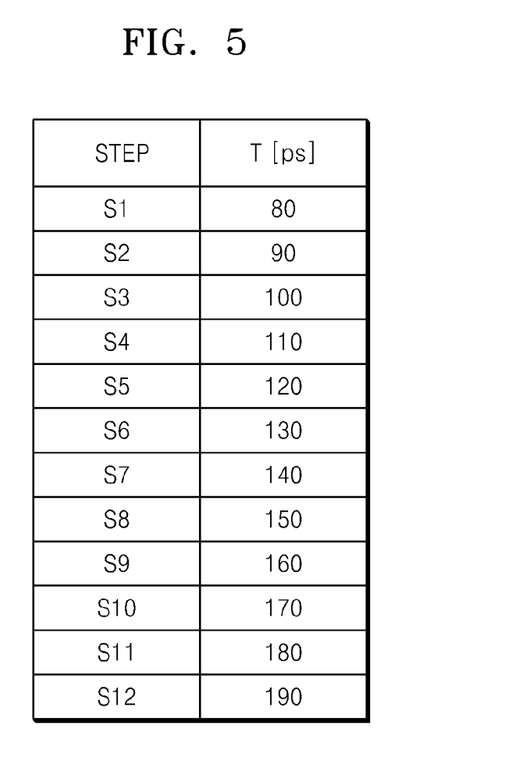
FIG. 5 is a table for explaining a method of determining a slew rate among transmission parameters, according to an embodiment of the present general inventive concept.

FIG. 5 is a table illustrating a method of determining a slew rate among the transmission parameters, according to an embodiment of the present general inventive concept.

A method of compensating for an error according to the present embodiment of the general inventive concept will now be described with reference to FIGS. 1, 2, and 5. It is assumed in FIG. 5 for purposes of convenience that the transmitting unit 110 initially transmits the data using a slew rate in a P5 step. That is, the data transmitted by the transmitting unit 110 has a slew rate value of 120 [ps]. It is assumed that if the data received by the receiving unit 130 has a slew rate value greater than 120 [ps], the receiving unit 130 determines that a distortion occurs in the received data.

If the data received by the receiving unit 130 has a slew rate value of 130 [ps], the receiving unit 130 may determine that the distortion occurs in the received data in operation S230. Thus, the control unit 150 may perform operation S240 to reduce the slew rate value by one step. That is, the control unit 150 may change a register value in such a way that the data to be transmitted has a slew rate value of 110 [ps] in an S4 step in operation S240, and the transmitting unit 110 may transmit the data having the slew rate value of 120 [ps].

If the transmitting unit 110 transmits the data having the slew rate value of 110 [ps], and the receiving unit 130 receives the data having the slew rate value of 120 [ps], the receiving unit 130 may determine that the distortion does not occur in the data in operation S230. Thus, the control unit 150 performs operation S250 to set a register value for determining the slew rate value to have the slew rate value of 110 [ps].

Times and time differences between the S1 through S12 steps are determined for the descriptive convenience in FIG. 5, and the inventive concept is not limited thereto. That is, the inventive concept may use other times and time differences between the S1 through S12 steps if occasions demand.

Figure 6A:
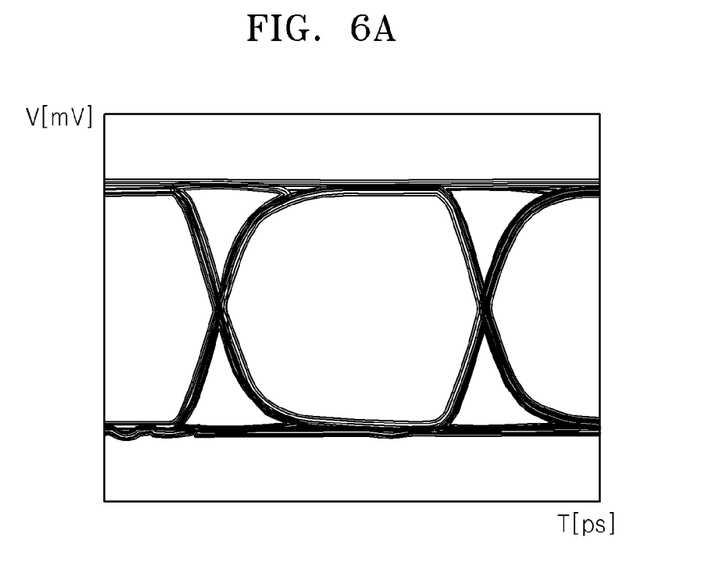
FIG. 6A is an eye diagram of data transmitted by a transmitting unit, according to an embodiment of the present general inventive concept.
Figure 6B:
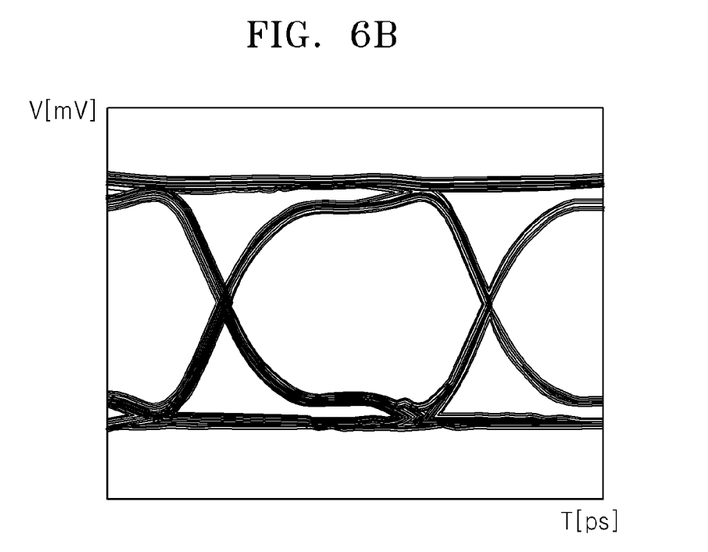
FIG. 6B is an eye diagram of data received by a receiving unit, according to an embodiment of the present general inventive concept.

FIG. 6A is an eye diagram of the data transmitted by the transmitting unit 110, according to an embodiment of the present general inventive concept. FIG. 6B is an eye diagram of the data received by the receiving unit 130, according to an embodiment of the present general inventive concept.

Although the data transmitted by the transmitting unit 110 has a normal waveform with reference to FIG. 6A, a distortion occurs in the data received by the receiving unit 130 due to various complicated reasons during transmission of the data with reference to FIG. 6B. In this case, the present embodiment of the inventive concept may automatically compensate for an error by repeatedly performing operations of changing at least one of a plurality of transmission parameters, such as amplitude, a pre-emphasis, and a slew rate, by one step, transmitting the data, and determining whether the distortion occurs in the data.

Figure 7A:
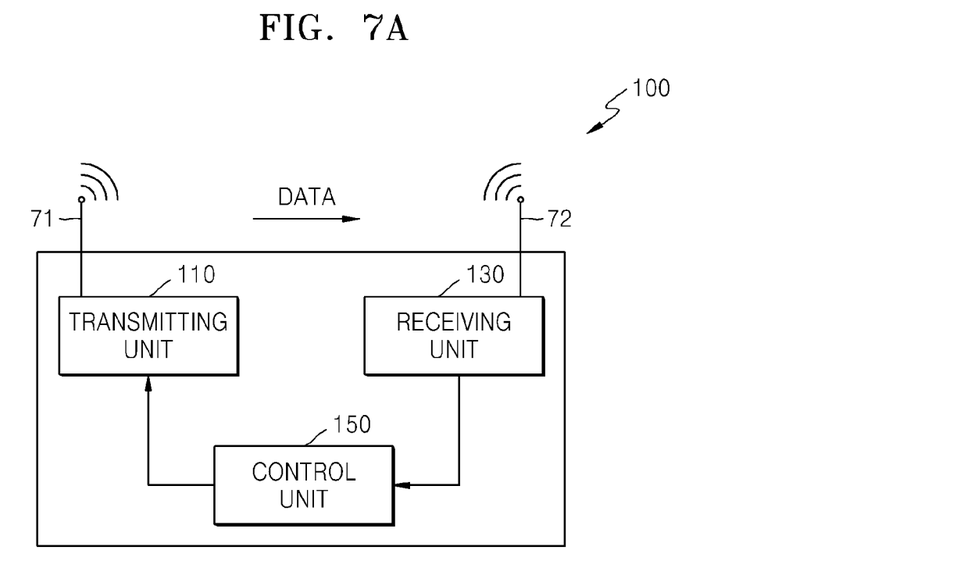
FIGS. 7A to 7C illustrate configurations of transceivers according to embodiments of the present general inventive concept.
Figure 7B:
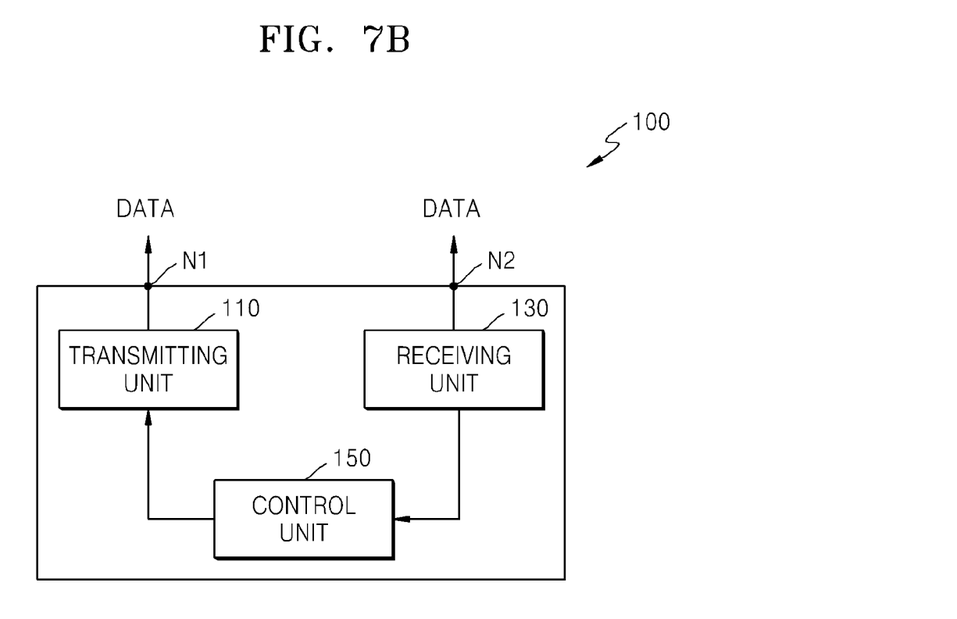
Figure 7C:
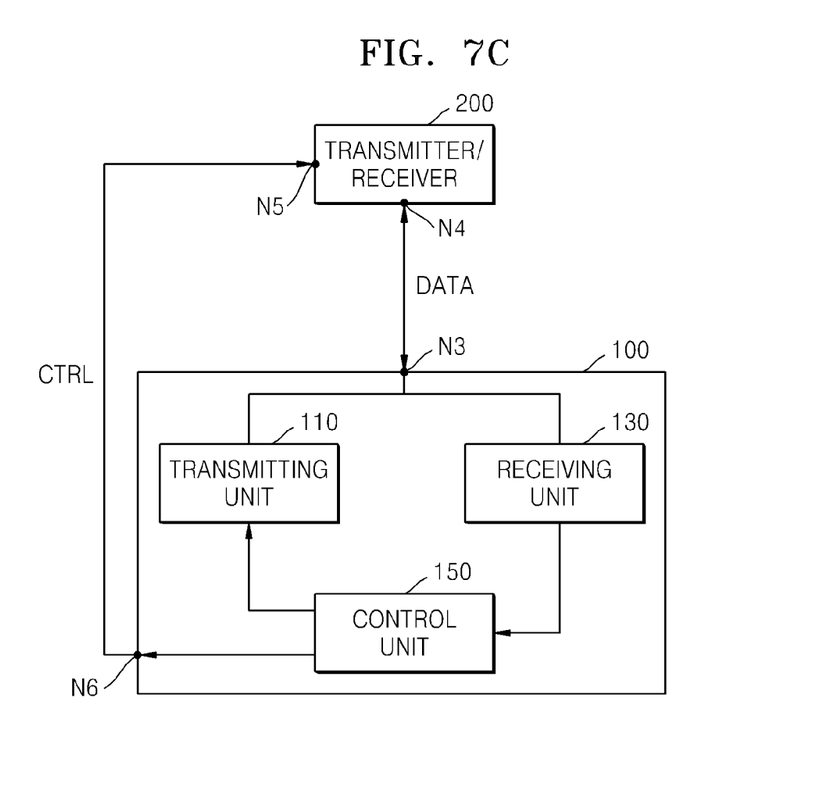

FIGS. 7A to 7C illustrate examples of transceivers according to embodiments of the present general inventive concept. FIG. 7A illustrates a wireless or radio frequency transceiver 100 having a separate antenna 71 and 72 for each of the transmitting unit 110 and the receiving unit 130, respectively. In such a case, the transmitting unit 110 may output the data via the antenna 71 and the receiving unit 130 may receive the data via the antenna 72.

FIG. 7B illustrates a transceiver system 100 having a wired output N1 and a wired input N2. In such a case, the output N1 may be connected to the input N2 to determine whether any distortion exists in the output signal carrying the data.

FIG. 7C illustrates a transceiver system 100 in which the transmitting unit 110 and the receiving unit 130 share an input/output N3. For example, if the input/output N3 is an antenna, each of the transmitting unit 110 and the receiving unit 130 may be connected to the antenna to transmit data or receive data respectively. In such a case, a transmitter and receiver 200 may be used to receive via a communication node N4 the data output from the transmitting unit 110 and to output the data to the receiving unit 130. The communication node N4 may be a wired connection or a wireless connection, such as an antenna. The control unit 150 may be connected to the control node N5 of the transmitter/receiver 200 via an output N6 to calibrate the transmitter/receiver 200 in the manner described with respect to FIGS. 1 to 6, so that the output of the transmitter/receiver 200 corresponds to the data output from the transmitting unit 110.

In other words, the control unit 150 may control the transmitter/receiver 200 to receive the data output from the transmitting unit 110 and to output the data with the same characteristics to the receiving unit 130. In such a manner, even if the transmitting unit 110 and the receiving unit 130 share an input/output node N3, the receiving unit 130 may receive the data output from the transmitting unit 110 after the data has been transmitted from the node N3. While the data output from the transmitting unit 110 could be directly input to the receiving unit 130 without being transmitted from the node N3, such a method may prevent the receiver 130 from detecting distortions that may be caused during transmission or reception of the data.

Although a transmitter/receiver 200 is described in FIG. 7, any other device may be used that outputs the data received from the transmitting unit 110 after a predetermined delay.

Figure 8:
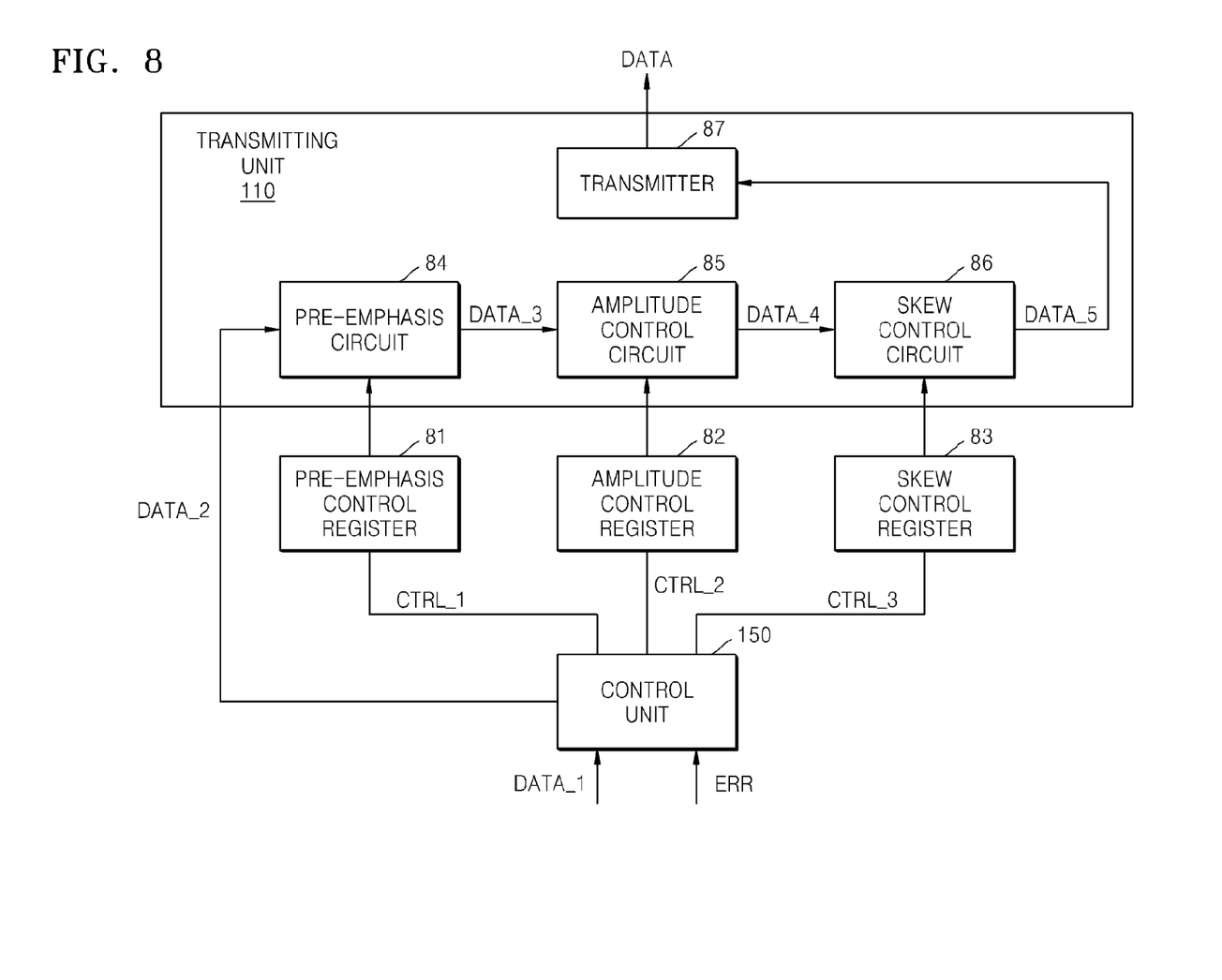
FIG. 8 illustrates examples of registers to control transmission parameters according to embodiments of the present general inventive concept.

FIG. 8 illustrates an example of a transmitting unit 110 and control unit 150 according to an example embodiment of the present general inventive concept. The control unit 150 may receive a data signal data_1 corresponding to data to be output from the transmitting unit 110, and an error signal ERR corresponding to a distortion detected in the data signal by the receiving unit 130 (in FIG. 1, for example). The control unit 150 may then output one or more control signals ctrl_1, ctrl_2, and ctrl_3 to control values in one or more of a pre-emphasis control register 81, an amplitude control register 82, and a skew control register 83. The register values may be input to a pre-emphasis circuit 84, an amplitude control circuit 85, and a skew control circuit 85, respectively, to adjust the pre-emphasis characteristics, amplitude, and skew of the data signal data_2. The data signal data_2 may be input to the pre-emphasis circuit 84 to generate the data signal data_3, to the amplitude control circuit 85 to generate the data signal data_4, and the skew control circuit 86 to generate the data signal data_5. The data signal data_5 may be input to the transmitter 87, which may be a signal processor, antenna, or other circuitry, to generate the output data signal DATA.

The registers 81, 21, and 83 may be located in either one of the transmitting unit 110 or the control unit 150, or they may be located outside each. Similarly, the pre-emphasis circuit 84, the amplitude control circuit 85, and the skew control circuit 86 may be located in the transmitting unit 110 or the control unit 150, or may be separate from each.

The pre-emphasis circuit 84 may include one or more filters to provide an emphasis to portions of the data signal data_2 at particular bandwidths. Similarly, the amplitude control circuit 85 may include one or more amplifiers or filters, and the skew control circuit 86 may include circuitry to adjust the skew of a data signal data_4. Although examples of registers, circuits, and control and transmitting units have been illustrated, additional or alternative circuitry may be provided as needed. For example, any registers and control circuits may be added to adjust any desired characteristic of the data signal DATA. In addition, each of the transmitting unit 110 and the control unit 150 may include one or more processors, logic units, memory, and additional circuitry to perform the functions described in the present specification.

While a transceiver has been described in particular in FIGS. 1-8, a separate transmitter and receiver connected by a control or analysis unit may also be used to adjust the characteristics of the transmitter.

While the general inventive concept has been particularly shown and described with reference to exemplary embodiments thereof, it will be understood that various changes in form and details may be made therein without departing from the spirit and scope of the following claims Although a few embodiments of the present invention have been shown and described, it would be appreciated by those skilled in the art that changes may be made in these embodiments without departing from the principles and spirit of the general inventive concept, the scope of which is defined in the claims and their equivalents.

What is claimed is:

1. A method comprising:
    receiving data at a receiving unit;
    determining whether distortion occurs in the received data based on a level of at least one transmission parameter of the received data;
    when it is determined that the distortion occurs in the received data, changing the at least one transmission parameter based on the level of the at least one transmission parameter of the received data by one step of a plurality of steps;
    transmitting the received data as next data using the changed at least one transmission parameter in a transmitting unit;
    receiving the next data in the receiving unit; and
    repeatedly performing the receiving data, determining, the changing, and the transmitting until it is determined that the distortion does not occur in the received next data based on the level of the at least one transmission parameter in the received next data.

2. The method of claim 1, wherein changing the at least one transmission parameter comprises changing at least one of a plurality of register values.

3. The method of claim 1, further comprising: setting the at least one transmission parameter at which distortion does not occur as a transmission parameter for a system that includes the transmitting unit.

4. The method of claim 1, wherein:
determining whether distortion occurs in the data includes determining if an amplitude of signals comprising the data is below a predetermined threshold; and
changing the at least one transmission parameter includes increasing an amplitude of output signals comprising the next data by one voltage step of a plurality of such voltage steps.

5. The method of claim 1, wherein:
determining whether distortion occurs in the data includes determining if a slew rate of signals comprising the data is above a predetermined threshold; and
changing the at least one transmission parameter includes decreasing a slew rate of output signals comprising the next data by one time step of a plurality of such time steps.

6. The method of claim 1, wherein:
determining whether distortion occurs in the data includes determining if a pre-emphasis value of signals comprising the data is below a predetermined threshold; and
changing the at least one transmission parameter includes increasing a pre-emphasis of output signals comprising the next data by one voltage step of a plurality of such voltage steps.

7. The method of claim 6, wherein increasing the pre-emphasis of output signals comprises increasing a pre-emphasis of at least one bandwidth less than an entire bandwidth of the output signals.

8. The method of claim 1, wherein:
determining whether distortion occurs in the data includes a cyclic redundancy check on the data; and
changing the at least one transmission parameter includes any selected from: adjusting a slew rate of output signals comprising the next data by one time step of a plurality of such time steps, and adjusting a pre-emphasis of output signals comprising the next data by one voltage step of a plurality of such voltage steps.

9. A system comprising:
a transmitting unit to transmit data, the transmitting unit including a pre-emphasis circuit configured to add pre-emphasis to transmitted data and comprising at least one filter, and an amplitude control circuit configured to adjust an amplitude of the transmitted data;
a receiving unit to receive data and to determine whether a distortion has occurred in the received data based on a level of at least one transmission parameter of the received data; and
a control unit to change at least one transmission parameter of the transmitted data by one step when the receiving unit determines that the distortion occurs in the received data, the step being selected based on the level of the at least one transmission parameter of the received data; wherein
the transmitting unit re-transmits the received data as the transmitted data using the changed at least one transmission parameter, the changed at least one transmission parameter being selected from the group consisting of amplitude and pre-emphasis.

10. The system of claim 9, further including:
a pre-emphasis control register coupled to the pre-emphasis circuit and the control unit to store a pre-emphasis value;
the pre-emphasis circuit configured to vary the pre-emphasis of the transmitted data according to the pre-emphasis value; and
the control unit configured to input the pre-emphasis value into the pre-emphasis register based on a level of pre-emphasis in the received data.

11. The system of claim 9, further including:
an amplitude control register coupled to the amplitude control circuit and the control unit to store an amplitude value;
the amplitude control circuit configured to adjust the amplitude of the transmitted data according to the amplitude value; and
the control unit configured to input the amplitude value into the amplitude control register based on an amplitude of the received data.

12. The system of claim 9, wherein:
the transmitting unit further includes a skew control circuit configured to adjust a skew of the transmitted data; and
the changed at least one transmission parameter is selected from the group consisting of amplitude, pre-emphasis, and skew.

13. The system of claim 12, further including:
a skew control register coupled to the skew control circuit and the control unit to store a skew value;
the skew control circuit configured to adjust the skew of the transmitted data according to the skew value; and
the control unit is configured to input the skew value into the skew control register based on a skew of the received data.

14. The system of claim 9, further including:
the transmitting unit is configured to re-transmit the received data at an input/output node;
the receiving unit is configured to receive data at the input/output node;
a transmitter/receiver coupled to the input/output node and configured to receive the re-transmitted data from the transmitting unit and to transmit it as the received data for the receiving unit; and
the control unit configured to control the transmitter/receiver via a communication path that does not include the input/output node.

15. The system of claim 9, further including:
the pre-emphasis circuit and amplitude control circuit are arranged in series having an input that receives the received data and an output that provides the transmitted data.

16. A system, comprising:
a transmitter to transmit a signal including data, the transmitter including an amplitude control circuit and a pre-emphasis circuit arranged in series with one another;
a receiver to receive the transmitted signal; and
a control unit to adjust at least one transmission characteristic of the transmitter when it is determined that the signal received by the receiver is distorted based on a level of the at least one transmission characteristic in the signal received;
wherein the transmitter transmits a next signal including the data after the at least one transmission characteristic of the transmitter is adjusted, and the control unit increases a transmission characteristic selected from the group of: amplitude and pre-emphasis.

17. The data transmission system according to claim 16, wherein the transmitter further includes a skew control circuit in series with pre-emphasis circuit and the amplitude control circuit, and the control unit further adjusts a skew rate of the next signal.

18. The data transmission system according to claim 17, further comprising at least one of a pre-emphasis control register, an amplitude control register, and a skew control register, and
the control unit adjusts a value in the amplitude control register the pre-emphasis control register or the skew control register to adjust the at least one transmission characteristic.

19. The data transmission system according to claim 16, wherein the control unit repeatedly adjusts the at least one transmission characteristic until it is determined that the signal received by the receiver is not distorted.

20. The system of claim 16, wherein:
the pre-emphasis circuit is configured to receive a data signal to transmit, and selectively perform pre-emphasis on the data signal according to pre-emphasis control values to generate) a pre-emphasis output signal; and
the amplitude control circuit is configured to receive the pre-emphasis output signal and selectively adjust an amplitude of the pre-emphasis output signal according to amplitude control values; wherein
the control unit is configured to generate the pre-emphasis control values and the amplitude control values in response to the received data.

* * * * *